US008752054B2

(12) United States Patent
Bentley et al.

(10) Patent No.: US 8,752,054 B2
(45) Date of Patent: Jun. 10, 2014

(54) INTELLIGENT MERGING OF TRANSACTIONS BASED ON A VARIETY OF CRITERIA

(75) Inventors: Jon Louis Bentley, New Providence, NJ (US); Frank John Boyle, III, Denver, CO (US); Anjur Sundaresan Krishnakumar, Princeton, NJ (US); Parameshwaran Krishnan, Basking Ridge, NJ (US); John H. Meiners, Boulder, CO (US); Navjot Singh, Denville, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 932 days.

(21) Appl. No.: 12/722,230

(22) Filed: Mar. 11, 2010

(65) Prior Publication Data
US 2011/0225586 A1 Sep. 15, 2011

(51) Int. Cl.
*G06F 9/46* (2006.01)
*G06F 7/00* (2006.01)

(52) U.S. Cl.
CPC ..................................... *G06F 9/466* (2013.01)
USPC .......................................... 718/101; 707/607

(58) Field of Classification Search
CPC ....................................................... G06F 9/466
See application file for complete search history.

(56) References Cited

U.S. PATENT DOCUMENTS

| 5,619,696 | A | | 4/1997 | Nakagawa |
| 6,041,312 | A | * | 3/2000 | Bickerton et al. ........... 705/36 R |
| 6,321,303 | B1 | | 11/2001 | Hoy et al. |
| 6,490,496 | B1 | * | 12/2002 | Dacey ........................... 700/118 |
| 7,184,439 | B1 | * | 2/2007 | Aubuchon et al. ......... 370/395.1 |
| 7,219,110 | B2 | * | 5/2007 | He ........................................ 1/1 |
| 7,277,997 | B2 | | 10/2007 | Vincent |
| 7,814,080 | B1 | * | 10/2010 | Luo et al. ...................... 707/703 |

(Continued)

OTHER PUBLICATIONS

Cully et al., "Remus: High Availability via Asynchronous Virtual Machine Replication," Department of Computer Science, The University of British Columbia, USENIX Association, NSDI Apr. 16-18, 2008: 5th USENIX Symposium on Networked Systems Design and Implementation, pp. 161-174.

(Continued)

*Primary Examiner* — Meng An
*Assistant Examiner* — Blake Kumabe
(74) *Attorney, Agent, or Firm* — Kacvinsky Daisak Bluni PLLC; John Maldjian; Alexander D. Walter

(57) ABSTRACT

An apparatus and methods are disclosed for intelligently determining when to merge transactions to backup storage. In particular, in accordance with the illustrative embodiment, queued transactions may be merged based on a variety of criteria, including, but not limited to, one or more of the following: the number of queued transactions; the rate of growth of the number of queued transactions; the calendrical time; estimates of the time required to execute the individual transactions; a measure of importance of the individual transactions; the transaction types of the individual transactions; a measure of importance of one or more data updated by the individual transactions; a measure of availability of one or more resources; a current estimate of the time penalty associated with shadowing a page of memory; and the probability of rollback for the individual transactions, and for the merged transaction.

20 Claims, 4 Drawing Sheets

(56) References Cited

U.S. PATENT DOCUMENTS

| | | | |
|---|---|---|---|
| 2005/0251524 A1* | 11/2005 | Shukla | 707/100 |
| 2006/0167891 A1* | 7/2006 | Blaisdell et al. | 707/10 |
| 2009/0248984 A1 | 10/2009 | Shen et al. | |
| 2010/0254264 A1* | 10/2010 | Ford et al. | 370/235 |
| 2011/0173619 A1* | 7/2011 | Fish | 718/101 |

OTHER PUBLICATIONS

High Availability article from WikiPedia, Retrieved Apr. 27, 2012 from http://web.archive.org/web/20090319234221/http://en.wikipedia.org/wiki/High_availability, Mar. 19, 2009, 5 pages.

High Availability article, Retrieved Apr. 27, 2012 from http://web.archive.org/web/20090606220829/http://www.linux-ha.org/, Jun. 6, 2009, 4 pages.

Marathon article, Retrieved Apr. 27, 2012 from http://web.archive.org/web/20090409173240/http://www.marathontechnologies.com/, Apr. 9, 2009, 2 pages.

*Ex parte Christopher J. Vineis, Richard Westhoff and Mayank Bulsara* Appeal 2008-5873 U.S. Appl. No. 10/268,425 Technology Center 1700.

* cited by examiner

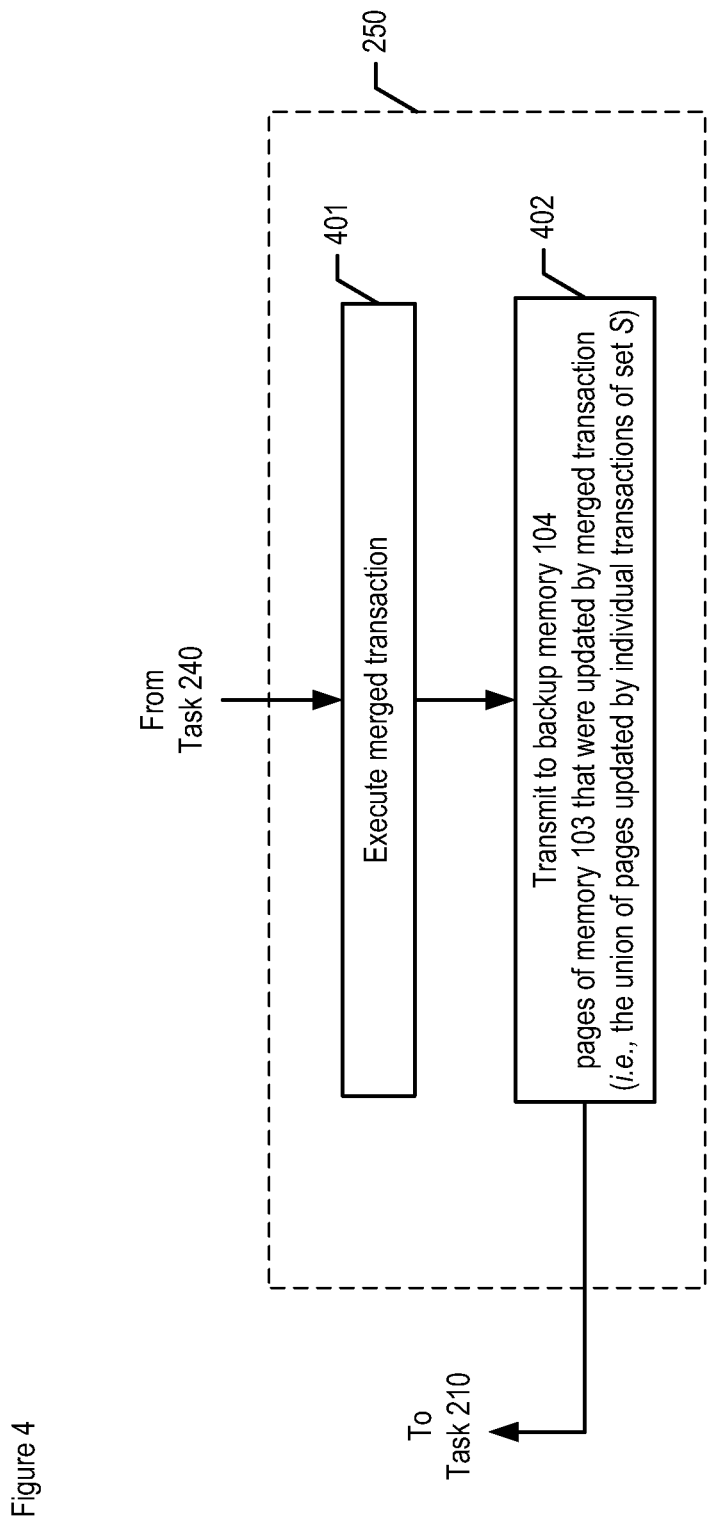

INTELLIGENT MERGING OF TRANSACTIONS BASED ON A VARIETY OF CRITERIA

FIELD OF THE INVENTION

The present invention relates to data-processing systems in general, and, more particularly, to a technique for merging transactions to improve performance.

BACKGROUND OF THE INVENTION

A transaction comprises a sequence of operations that behave in an atomic, all-or-nothing fashion. When a failure occurs during a transaction, the transaction must be rolled back in order to return the system to its prior state. For example, if a transaction that transfers money from a savings account to a checking account fails after money has been deducted from the savings account, but before money has been added to the checking account, a rollback of the transaction will restore the balance of the savings account to its value prior to the deduction. A data-processing system (e.g., a mainframe computer, a server, a desktop computer, etc.) that processes transactions is referred to as a transaction-processing system.

SUMMARY OF THE INVENTION

The present invention is based on the observation that in transaction-processing systems, the execution of each transaction is often accompanied by one or more associated tasks. For example, in order to provide high availability and fault tolerance, a transaction-processing system might duplicate (or shadow) the system's state onto a backup memory or system after each transaction is executed. As another example, a remote client (e.g., a desktop computer, a smartphone, etc.) might transmit a transaction over a network to a transaction-processing system, where it is then executed.

Such associated tasks can provide high availability and other desirable features, but the accompanying overhead can significantly degrade performance. In order to mitigate this performance degradation, the present invention provides a technique by which successive transactions are advantageously merged. For example, when successive transactions update a particular page of memory, merging the transactions and then shadowing the system state after executing the merged transaction can reduce the shadowing overhead, compared to shadowing the system state after each individual transaction. Naturally, however, if a rollback occurs, rolling back a merged transaction will often incur a greater penalty than rolling back one of the individual transactions. Similarly, merging transactions at a remote client prior to transmission to a transaction-processing system should result in a lower overall transmission time penalty, compared to transmitting transactions individually, but also can increase the penalty associated with a rollback.

The technique of the present invention attempts to intelligently predict whether the advantage gained by merging particular transactions is likely to outweigh the associated drawbacks. In particular, in accordance with the illustrative embodiment, transactions awaiting processing in a transaction queue may be merged based on a variety of criteria, including one or more of the following: the number of transactions in the queue; the rate of growth of the number of transactions in the queue; the calendrical time; estimates of the time required to execute the individual transactions; a measure of importance of the individual transactions; the transaction types of the individual transactions; a measure of importance of one or more data updated by the individual transactions; a measure of availability of one or more resources (e.g., available bandwidth of a communications channel, available processing power, CPU utilization, etc.); a current estimate of the time penalty associated with shadowing a page of memory; and the probability of rollback for the individual transactions, and for the merged transaction.

The illustrative embodiment comprises: a queue for storing a plurality of transactions, wherein said plurality of transactions comprises a first transaction and a second transaction, and wherein said first transaction is before said second transaction in said queue; and a processor for: (a) determining whether to merge the first transaction and the second transaction based on the number of transactions in the queue; and (b) when the determination is affirmative, (i) merging the first and second transactions, and (ii) processing the merged transaction, wherein the processing of the merged transaction comprises executing the merged transaction and transmitting a signal that is based on the merged transaction, and otherwise, (i) processing the first transaction, and (ii) processing the second transaction, wherein the processing of the first transaction comprises executing the first transaction and transmitting a signal that is based on the first transaction, and wherein the processing of the second transaction comprises executing the second transaction and transmitting a signal that is based on the second transaction.

BRIEF DESCRIPTION OF THE DRAWINGS

FIG. 4 depicts a detailed flowchart of task 250, as shown in FIG. 2, in accordance with the illustrative embodiment of the present invention.

DETAILED DESCRIPTION

For the purposes of this specification, the term "page" is defined as a fixed number of bytes of memory—perhaps forced to be aligned on a boundary such as an integer multiple of that size—and applies to virtual memory as well as physical memory.

For the purposes of the specification and claims, the term "calendrical time" is defined as indicative of one or more of the following:

(i) a time (e.g., 16:23:58, etc.), (ii) one or more temporal designations (e.g., Tuesday, November, etc.), (iii) one or more events (e.g., Thanksgiving, John's birthday, etc.), and (iv) a time span (e.g., 8:00 PM to 9:00 PM, etc.).

Figure 1:
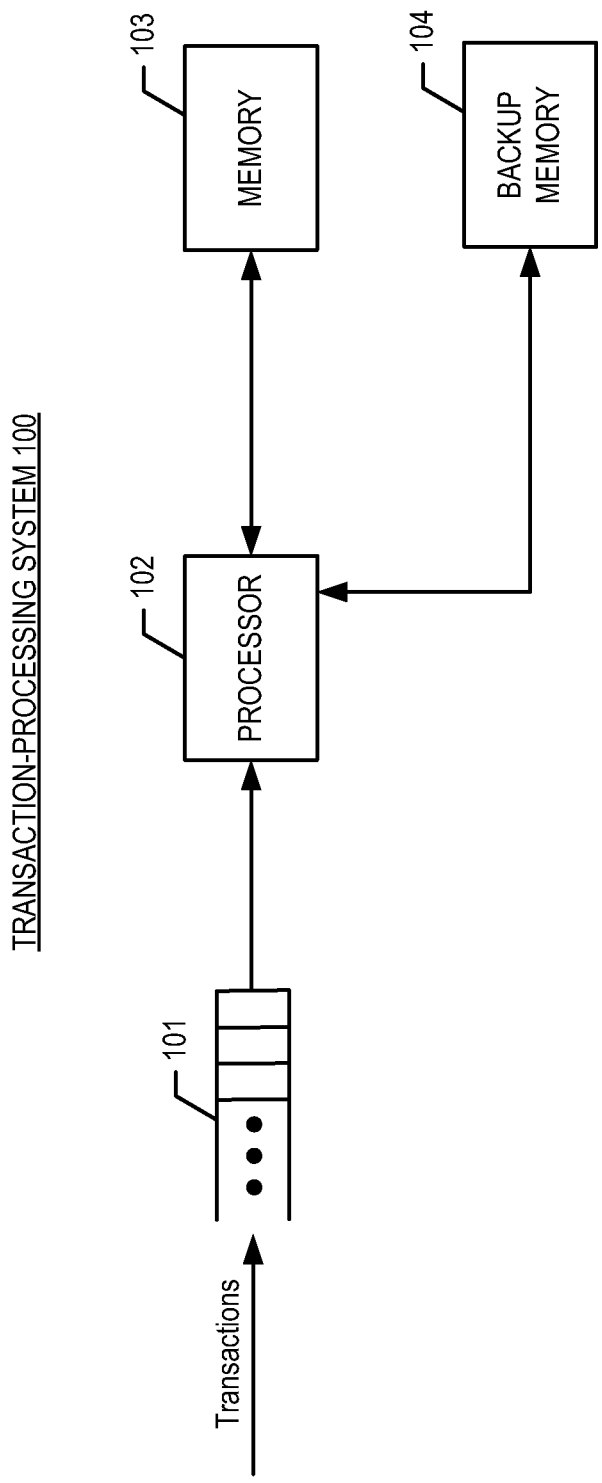
FIG. 1 depicts a block diagram of the salient elements of illustrative transaction-processing system 100, in accordance with the illustrative embodiment of the present invention.

FIG. 1 depicts a block diagram of the salient elements of illustrative transaction-processing system 100, in accordance with the illustrative embodiment of the present invention. As shown in FIG. 1, transaction-processing system 100 comprises transaction queue 101, processor 102, memory 103, and backup memory 104, interconnected as shown.

Transaction queue 101 is a first-in-first-out (FIFO) in which arriving transactions are inserted and await processing by processor 102, as is well-known in the art. As will be appreciated by those skilled in the art, in some other embodiments of the present invention transaction queue 101 might be a different type of queue (e.g., a priority queue, a multi-stage queue, etc.), and it will be clear to those skilled in the art, after reading this disclosure, how to employ the techniques of the illustrative embodiment for such alternative embodiments.

Processor 102 is a general-purpose processor that is capable of executing instructions stored in memory 103 and backup memory 104, of reading data from and writing data into memory 103 and memory 104, and of executing the tasks described below and with respect to FIGS. 2 through 4. As will be appreciated by those skilled in the art, in some embodiments of the present invention processor 102 might be a single-core processor, while in some other embodiments processor 102 might be a multi-core processor, while in still yet other embodiments processor 102 might be a special-purpose processor (e.g., a network processor, an applications processor, a graphics processor, etc.). In any case, it will be clear to those skilled in the art, after reading this disclosure, how to make and use embodiments of the present invention comprising processor 102.

Memory 103 and backup memory 104 are capable of storing data and executable instructions, as is well-known in the art, and might be any combination of random-access memory (RAM), flash memory, disk memory, etc. As will be appreciated by those skilled in the art, in some embodiments of the present invention memory 103 and backup memory 104 might be different types of memory (e.g., one RAM and one disk, etc.), while in other embodiments memory 103 and backup memory 104 might be similar types of memory. As will further be appreciated by those skilled in the art, in some embodiments of the present invention one or both of memory 103 and backup memory 104 might belong to another data-processing system not depicted in FIG. 1 (e.g., a database management system, etc.). In any case, it will be clear to those skilled in the art, after reading this disclosure, how to make and use embodiments of the present invention comprising memories 103 and 104.

As will be appreciated by those skilled in the art, FIG. 1 merely depicts the seminal elements of transaction-processing system 100, and it will be clear to those skilled in the art, after reading this disclosure, how to employ the techniques of the illustrative embodiments in transaction-processing systems with additional elements (e.g., additional processors, additional memories, one or more transceivers connected to a network, additional data-processing systems, network-attached storage devices, etc.). Moreover, although the techniques of the illustrative embodiment are disclosed in the context of memory shadowing in fault-tolerant transaction-processing systems, it will be clear to those skilled in the art, after reading this disclosure, how to employ the techniques of the illustrative embodiment in other applications (e.g., transaction merging in remote clients, etc.).

Figure 2:
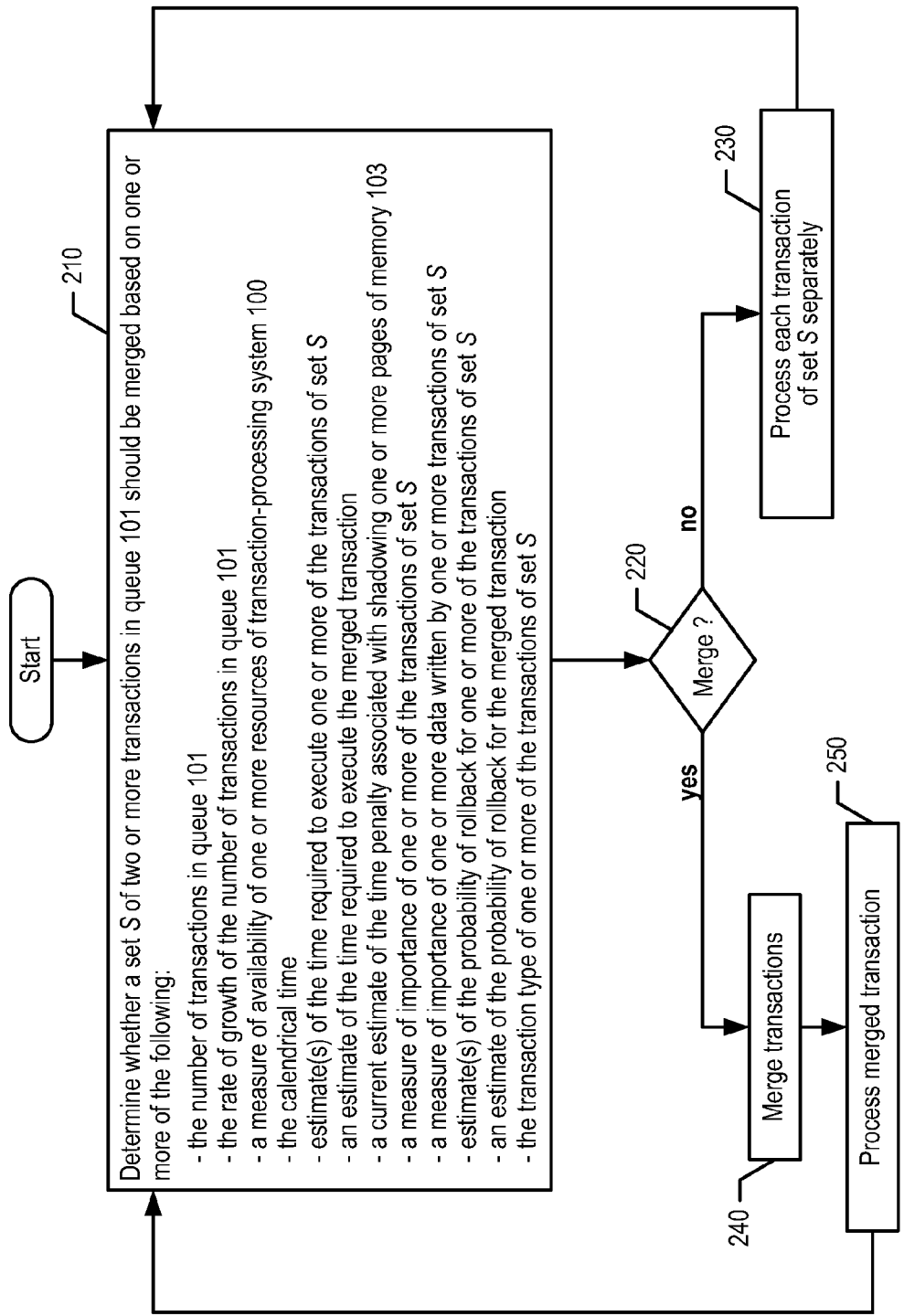
FIG. 2 depicts the salient tasks of a method for determining whether to merge two or more transactions in transaction queue 101, as shown in FIG. 1, in accordance with the illustrative embodiment of the present invention.

FIG. 2 depicts the salient tasks of a method for determining whether to merge two or more transactions in transaction queue 101, in accordance with the illustrative embodiment of the present invention. It will be clear to those skilled in the art, after reading this disclosure, which tasks depicted in FIG. 2 can be performed simultaneously or in a different order than that depicted.

Task 210 determines whether a set S of two or more transactions in queue 101 should be merged based on one or more of the following:

the number of transactions in transaction queue 101;
  [when the number of transactions in queue 101 exceeds a particular threshold, it might be desirable to merge transactions in order to keep the maximum waiting time, for example, below a certain level]

the rate of growth of the number of transactions in transaction queue 101;
  [same rationale as above]

a measure of availability of one or more resources of transaction-processing system 100;
  [it might be advantageous to merge transactions when bandwidth, I/O throughput, etc. is limited]

the calendrical time;
  [the likelihood of a rollback might be less than usual at particular times]

one or more estimates of the time required to execute one or more of the transactions of set S;
  [smaller rollback penalty when merging short transactions]

an estimate of the time required to execute the merged transaction;
  [operations might be safely removed or combined in the merged transaction, as described below]

a current estimate of the time penalty associated with shadowing one or more pages of memory 103;
  [when the time penalty for shadowing memory is higher than usual, the benefit of merging transactions is typically greater]

a measure of importance of one or more of the transactions of set S;
  [in some instances it might not be desirable to merge a particular transaction that is identified as important, while in some other instances it might in fact be desirable to merge such a transaction]

a measure of importance of one or more data written by one or more transactions of set S;
  [it might not be desirable to merge a transaction that updates a particular datum that is identified as important]

one or more estimates of the probability of rollback for one or more of the transactions of set S;
  [the higher the probability of rollback the less desirable it is to merge the transaction]

an estimate of the probability of rollback for the merged transaction;
  [same rationale as above]

the transaction type of one or more of the transactions of set S
  [e.g., read-only, write-only, both reads and writes, read/write ratio above a particular threshold, simple vs. complex computations, etc.]

As will be appreciated by those skilled in the art, the transactions of set S do not necessarily have to constitute a contiguous sequence at the head of transaction queue 101. For example, set S might consist of the first transaction and the third transaction in transaction queue 101. As will further be appreciated by those skilled in the art, some other embodiments of the present invention might employ one or more other criteria or conditions in the determination of task 210, either in addition to, or instead of, those of the illustrative embodiment, and it will be clear to those skilled in the art, after reading this disclosure, how to make and use such alternative embodiments.

Task 220 branches based on whether the determination of task 210 is affirmative; if not, execution continues at task 230, otherwise execution continues at task 240.

At task 230, each transaction of set S is processed separately. Task 230 is described in detail below and with respect to FIG. 3. After task 230, execution continues back at task 210.

At task 240, the transactions of set S are merged. As will be appreciated by those skilled in the art, in some embodiments of the present invention the transactions might be merged by simply concatenating their constituent operations, while in some other embodiments the merging might advantageously combine or reduce the total number of operations, much as an optimizing compiler might do so when generating object code from source code. For example, if two transactions both write new values to a particular datum and there are no intervening reads of that datum, then only the last write is necessary. As another example, if two transactions increment a "counter" datum and there are no intervening reads of the datum, then these increments can be combined into a single operation; similarly, other types of functions applied to a datum might be composed into a single function. It will be appreciated by those skilled in the art, after reading this disclosure, that even when no such "intelligent" merging is performed (it might not be possible for some transactions), the merging can still provide the benefit of reducing the total cost of the tasks associated with processing transactions (e.g., shadowing memory, etc.), as illustrated below and described with respect to FIGS. 3 and 4.

At task 250, the merged transaction is processed. Task 250 is described in detail below and with respect to FIG. 4. After task 250, execution continues back at task 210.

Figure 3:
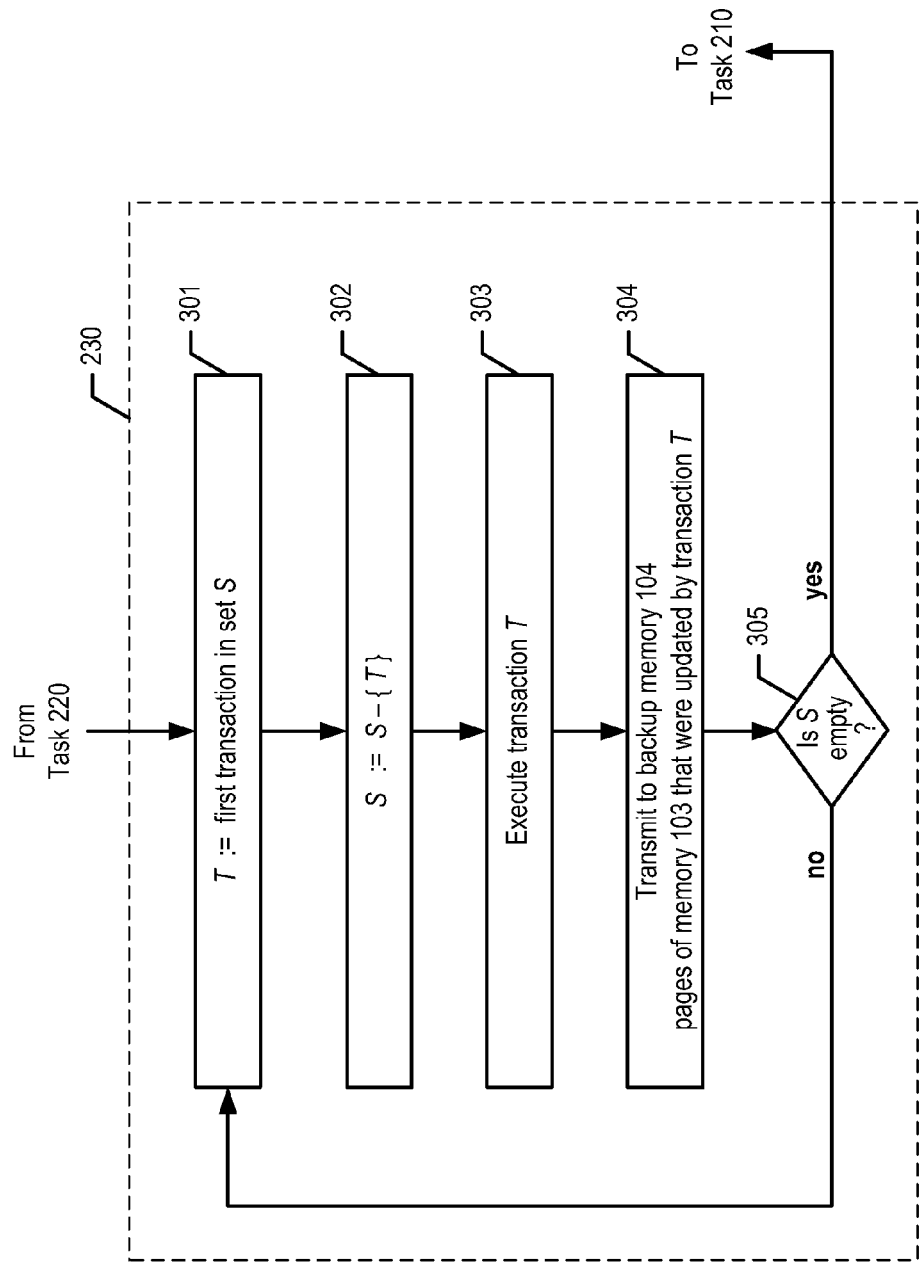
FIG. 3 depicts a detailed flowchart of task 230, as shown in FIG. 2, in accordance with the illustrative embodiment of the present invention.

FIG. 3 depicts a detailed flowchart of task 230, in accordance with the illustrative embodiment of the present invention. It will be clear to those skilled in the art, after reading this disclosure, which tasks depicted in FIG. 3 can be performed simultaneously or in a different order than that depicted.

At task 301, variable T is set to the first transaction in S.

At task 302, transaction T (i.e., the transaction referred to by variable T) is removed from set S.

At task 303, transaction T is executed, in well-known fashion.

At task 304, pages of memory 103 that were updated by transaction T are transmitted to backup memory 104, in well-known fashion.

Task 305 branches based on whether set S is empty; if S is non-empty, execution continues back at task 301, otherwise, execution continues back at task 210 of FIG. 2.

As will be appreciated by those skilled in the art, although in the illustrative embodiment the details of task 230 are disclosed in the context of performing memory shadowing, task 230 can easily be tailored to perform other types of tasks associated with processing transactions (e.g., transmitting transactions to another processor or data-processing system, etc.).

FIG. 4 depicts a detailed flowchart of task 250, in accordance with the illustrative embodiment of the present invention. It will be clear to those skilled in the art, after reading this disclosure, which tasks depicted in FIG. 4 can be performed simultaneously or in a different order than that depicted.

At task 401, the merged transaction is executed, in well-known fashion.

At task 402, pages of memory 103 that were updated by the merged transaction (i.e., the union of pages updated by individual transactions of set S) are transmitted to backup memory 104, in well-known fashion. As will be appreciated by those skilled in the art, the time required to transmit pages updated by the merged transaction at task 420 will typically be less than the sum of the times required to transmit pages updated by the individual transaction of set S at task 304 of FIG. 3.

After task 402, execution continues back at task 210 of FIG. 2.

As will be appreciated by those skilled in the art, while the illustrative embodiment is disclosed in the context of merging transactions, the techniques of the present invention can be employed for merging other types of data operations (e.g., invocations of object accessor and mutator methods, etc.), and it will be clear to those skilled in the art, after reading this disclosure, how to make and use embodiments of the present invention for such applications.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
a queue configured to store a plurality of atomic transactions, wherein said plurality of atomic transactions comprises a first transaction and a second transaction, and wherein said first transaction is before said second transaction in said queue;
a memory; and
a processor coupled to the memory, the processor configured to perform the steps of:
(a) determining whether to merge said first transaction and said second transaction based on whether the number of transactions in said queue exceeds a first predetermined threshold and whether a rate of growth of the number of transactions in a transaction queue exceeds a second predetermined threshold; and
(b) when the determination is affirmative,
(i) merging the first and second transactions,
(ii) processing the merged transaction, wherein the processing comprises transmitting a signal that is based on said merged transaction, and
(iii) storing in the memory a system state produced by the processing, and otherwise,
(i) processing said first transaction, wherein the processing comprises transmitting a signal that is based on said first transaction,
(ii) processing said second transaction, wherein the processing comprises transmitting a signal that is based on said second transaction, and
(iii) storing in the memory a system state produced by the processing of the first transaction and the processing of the second transaction.

2. The apparatus of claim 1 wherein the time required to process said merged transaction is less than the sum of the times required to process said first transaction and said second transaction.

3. The apparatus of claim 1 further comprising a first memory, wherein a first non-empty set of pages of said first memory is updated by said first transaction, and wherein a second non-empty set of pages of said first memory is updated by said second transaction.

4. The apparatus of claim 3 further comprising a second memory, wherein the processing of said first transaction comprises copying to said second memory the updated contents of said first set of pages, and wherein the processing of said second transaction comprises copying to said second memory the updated contents of said second set of pages, and wherein the processing of said merged transaction comprises copying to said second memory the updated contents of the union of said first set of pages and said second set of pages.

5. The apparatus of claim 3 wherein when:
(i) the first transaction stores a first value in a location of said first memory, and (ii) the second transaction is after the first transaction and stores a second value in said location, and (iii) the second transaction does not read the contents of said location prior to storing said second value in said location, and (iv) the first and second transactions are merged, the merged transaction eschews storing said first value in said location.

6. The apparatus of claim 1 wherein the determination whether to merge the first and second transactions is also based on an estimate of the time required to execute the first transaction.

7. The apparatus of claim 6 wherein the determination whether to merge the first and second transactions is also based on an estimate of the time required to execute the second transaction.

8. An apparatus comprising:
a queue configured to store a plurality of atomic transactions, wherein said plurality of transactions comprises a first transaction and a second transaction, and wherein said first transaction is before said second transaction in said queue; and
a memory;
a processor coupled to the memory, the processor configured to perform the steps of:
(a) determining whether to merge said first transaction and said second transaction based on whether the calendrical time is within a predetermined interval of time and whether a rate of growth of the number of transactions in a transaction queue exceeds a predetermined threshold rate of growth; and
(b) when the determination is affirmative,
  (i) merging the first and second transactions,
  (ii) processing the merged transaction, wherein the processing comprises transmitting a signal that is based on said merged transaction, and
  (iii) storing in the memory a system state produced by the processing, and otherwise,
  (i) processing said first transaction, wherein the processing comprises transmitting a signal that is based on said first transaction,
  (ii) processing said second transaction, wherein the processing comprises transmitting a signal that is based on said second transaction, and
  (iii) storing in the memory a system state produced by the processing of the first transaction and the processing of the second transaction.

9. The apparatus of claim 8 wherein the time required to process said merged transaction is less than the sum of the times required to process said first transaction and said second transaction.

10. The apparatus of claim 8 further comprising a first memory, wherein a first non-empty set of pages of said first memory is updated by said first transaction, and wherein a second non-empty set of pages of said first memory is updated by said second transaction.

11. The apparatus of claim 10 further comprising a second memory, wherein the processing of said first transaction comprises copying to said second memory the updated contents of said first set of pages, and wherein the processing of said second transaction comprises copying to said second memory the updated contents of said second set of pages, and wherein the processing of said merged transaction comprises copying to said second memory the updated contents of the union of said first set of pages and said second set of pages.

12. The apparatus of claim 8 wherein the determination whether to merge the first and second transactions is also based on a measure of importance of said first transaction.

13. The apparatus of claim 8 wherein said first transaction is of a first transaction type, and wherein said second transaction is of a second transaction type, and wherein the determination whether to merge the first and second transactions is also based on one or both of said first transaction type and said second transaction type.

14. The apparatus of claim 8 wherein the determination whether to merge the first and second transactions is also based on a measure of availability of a resource of said apparatus.

15. An apparatus comprising:
a queue for storing configured to store a plurality of atomic transactions;
a memory; and
a processor coupled to the memory, the processor configured to perform the steps of:
(a) determining whether to merge a first of said plurality of atomic transactions and a second of said plurality of atomic transactions based on a measure of whether response time for previously-executed transactions exceeds a first predetermined threshold and whether a rate of growth of the number of transactions in a transaction queue exceeds a second predetermined threshold; and
(b) when the determination is affirmative: merging the first and second transactions; executing the merged transaction; and storing in the memory a system state produced by the merged transaction, and
otherwise, executing the first and second transactions separately; and storing in the memory a system state produced by the execution of the first transaction and the execution of the second transaction.

16. The apparatus of claim 15 further comprising:
a first memory whose contents is updated by one or more of said plurality of transactions; and
a second memory for storing a shadowed copy of the contents of said first memory.

17. The apparatus of claim 16 wherein the determination whether to merge the first and second transactions is also based on a current estimate of the time penalty associated with shadowing a page of said first memory.

18. The apparatus of claim 15 wherein the determination whether to merge the first and second transactions is also based on an estimate of the probability of rollback for at least one of: (i) said first transaction, (ii) said second transaction, and (iii) the merged transaction.

19. The apparatus of claim 15 wherein the determination whether to merge the first and second transactions is also based on a measure of importance of a datum written by said first transaction.

20. The apparatus of claim 15 wherein the determination whether to merge the first and second transactions is also based on the rate of growth of the number of transactions in said queue.

* * * * *